(12) United States Patent
Steenhuis et al.

(10) Patent No.: US 7,621,697 B2
(45) Date of Patent: Nov. 24, 2009

(54) ABANDONMENT AND RECOVERY SYSTEM AND METHOD, AND CABLE CONNECTOR

(75) Inventors: Andre Luur Jan Steenhuis, Berkel en Rodenrijs (NL); Jeroen Regelink, The Hague (NL)

(73) Assignee: Allseas Group S.A., Chatel-Saint-Denis (CH)

( * ) Notice: Subject to any disclaimer, the term of this patent is extended or adjusted under 35 U.S.C. 154(b) by 155 days.

(21) Appl. No.: 11/407,766

(22) Filed: Apr. 19, 2006

(65) Prior Publication Data

US 2007/0248418 A1 Oct. 25, 2007

(51) Int. Cl.
*F16L 1/12* (2006.01)

(52) U.S. Cl. .................. 405/173; 405/166; 405/158

(58) Field of Classification Search ............... 405/173, 405/158
See application file for complete search history.

(56) References Cited

U.S. PATENT DOCUMENTS

| | | | | |
|---|---|---|---|---|
| 3,319,426 A * | 5/1967 | Slonczewski | ............... | 405/173 |
| 3,640,400 A * | 2/1972 | Becraft | ............... | 405/173 |
| 3,842,612 A * | 10/1974 | Arnold | ............... | 405/173 |
| 4,051,687 A | 10/1977 | Ells | | |
| 4,146,345 A * | 3/1979 | Silvestri | ............... | 405/172 |
| 4,234,268 A * | 11/1980 | Scodino | ............... | 405/173 |
| 4,444,528 A * | 4/1984 | Scodino et al. | ............... | 405/173 |
| 4,832,530 A * | 5/1989 | Andersen et al. | ............... | 405/170 |
| 5,044,827 A * | 9/1991 | Gray et al. | ............... | 405/173 |
| 5,178,429 A * | 1/1993 | Gray et al. | ............... | 294/93 |
| 5,188,483 A * | 2/1993 | Kopp et al. | ............... | 405/173 |
| 5,190,107 A * | 3/1993 | Langner et al. | ............... | 405/209 |
| 5,203,599 A * | 4/1993 | Lewis et al. | ............... | 405/158 |
| 5,318,384 A * | 6/1994 | Maloberti et al. | ............... | 405/173 |
| 5,507,596 A | 4/1996 | Bostelman | | |
| 5,836,548 A | 11/1998 | Dietz | | |
| 6,189,834 B1 | 2/2001 | Dietz | | |
| 6,402,428 B1 * | 6/2002 | Morisi et al. | ............... | 405/173 |
| 6,729,802 B2 * | 5/2004 | Giovannini et al. | ............... | 405/173 |
| 7,182,550 B2 * | 2/2007 | Renkema | ............... | 405/173 |
| 2004/0115037 A1 | 6/2004 | Coblentz | | |
| 2005/0160959 A1 | 7/2005 | Roodenburg | | |
| 2006/0115331 A1 * | 6/2006 | Matteucci | ............... | 405/158 |

FOREIGN PATENT DOCUMENTS

GB 538 561 8/1941

OTHER PUBLICATIONS

European Patent Office, European Search Report, Oct. 4, 2007, from related European Patent Application No. EP 07105947.1, filed Apr. 11, 2007.

* cited by examiner

*Primary Examiner*—Frederick L Lagman
(74) *Attorney, Agent, or Firm*—Kenyon & Kenyon LLP

(57) ABSTRACT

A system for abandonment or recovery of a load, e.g., a pipeline or sub-sea structure, includes: at least two cables, each with a length adapted for a certain water depth and with a first end and a second end; a winch system for the at least two cables, the first ends of each cable being connected to the winch system; and a connection device for connecting the second ends of each cable to the load to be abandoned or recovered.

17 Claims, 5 Drawing Sheets

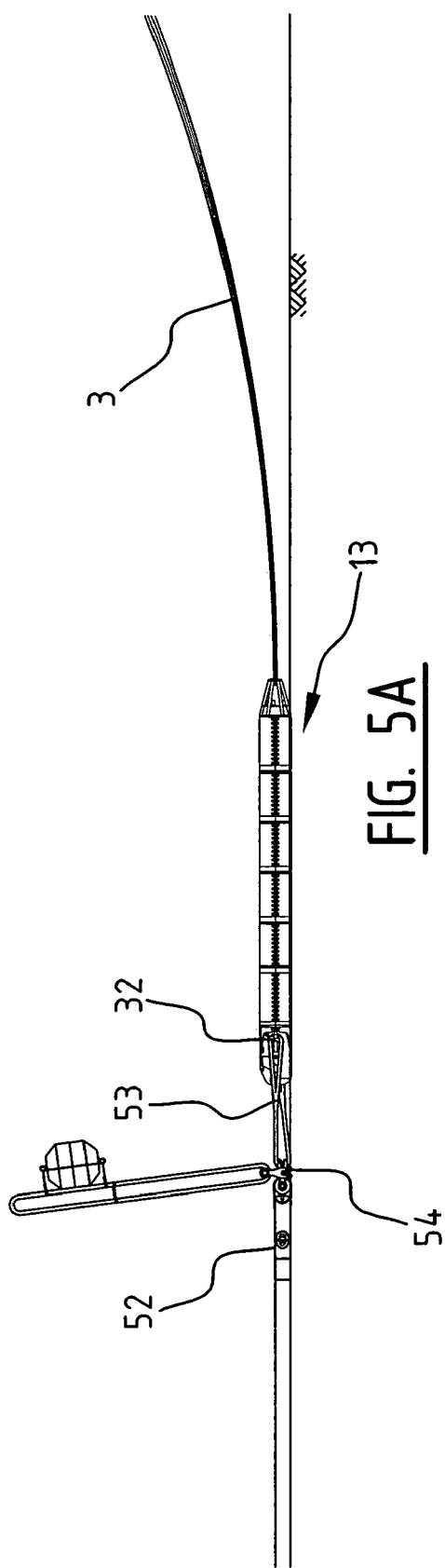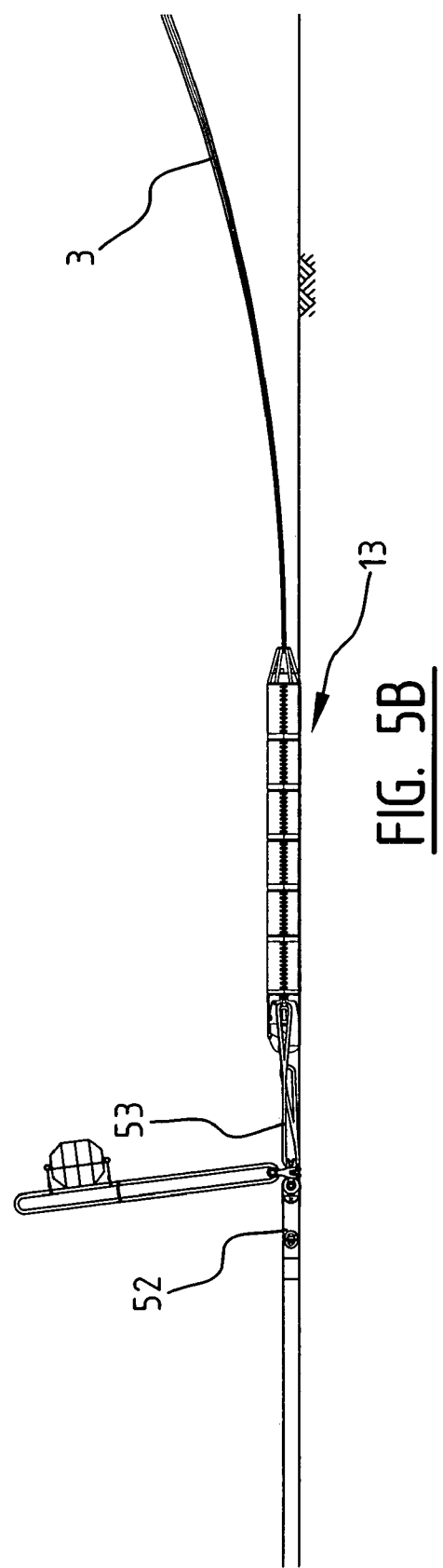

ABANDONMENT AND RECOVERY SYSTEM AND METHOD, AND CABLE CONNECTOR

BACKGROUND OF THE INVENTION

1. Field of the Invention

The invention relates generally to deepwater pipeline laying and more particularly to an abandonment and recovery (A&R) system and method, and an A&R cable connector, in particular for deep water applications.

2. Background of the Related Art

The J-lay method is commonly used for deepwater pipelaying. With this method each portion of the pipeline to be laid is erected to a vertical position, welded to the main pipe line and lowered directly into the water with a single bend, giving the pipeline which is being laid the form of a "J".

Also the S-lay technique is becoming more and more popular for deepwater and ultra-deepwater pipelaying. With this method each portion of the pipeline to be connected is welded to the main pipeline and moved in a horizontal position over the stinger into the water, with a double bend giving the pipeline which is being laid the form of an "S". The S-lay technique has the advantage that it allows higher lay rates.

When a load, such as a pipeline or a sub-sea structure must be abandoned from a vessel, a typical method consists of welding an abandonment and recovery (A&R) head with a lifting eye to the end of the pipeline or sub-sea structure. A coupling shackle connected to a cable coupled to a winch on the vessel is connected to the lifting eye of the A&R head and the pipeline or sub-sea structure is lowered to the seabed.

J-lay and S-lay for deepwater applications entail not only the use of heavy tension equipment, but also require extra winch capacity and in particular cables with a very high tensile strength to support the high load resulting from the long length of pipeline, which initially extends from the vessel to the seabed. However, the diameter of the cable is typically limited, so that choosing to use a thicker cable at these lengths cannot solve the extra capacity needed. Also winches capable of handling loads of 500 T or more are not common and expensive.

Another problem of the existing A&R systems and methods relates to the control of the movement of the cables, and especially the rotation thereof during abandonment or recovery.

International patent application WO 01/48410 discloses a method of abandoning a pipeline being laid by a vessel having an A&R system, wherein a sealine is initially held by a pipe laying and tensioning arrangement. The method includes a step of reducing the tension at sea level by connecting one or more light buoyant elongate members to the end of the pipeline. This method has the disadvantage that special buoyant elongate members are needed and that the connection thereof may be time consuming. Moreover this technique is not well suited for S-lay because the buoyant elongate members have to pass over the stinger.

Hence, it would be desirable to provide an A&R system and A&R cable connector that solves at least partly the problems discussed above.

SUMMARY OF THE INVENTION

According to a first aspect, the present invention provides a system for abandonment or recovery of a load, typically a pipeline, at sea, and in particular in deep and ultra-deep water. In order to be able to handle heavy loads the A&R system according to the invention comprises at least two cables, each with a length adapted for a certain water depth, and in particular for deep water. These two cables are connected with first ends to a storage of a winch system for providing a suitable cable length. Connecting means for coupling the second ends of each cable to the load to be abandoned or recovered, are also provided. By using more than one cable the tension weight is divided over the different cables, so that thinner cables can be used. The connecting means and the winch system ensure that the cables do not get intermingled during abandonment or recovery of a load.

Ultra-deep water applications preferably use at least three cables, and most preferably four cables.

According to a further aspect of the invention the A&R system preferably comprises an even number of cables. This has the advantage that the tendency of the cables to untwist under load can be compensated by using the same number of steel cables with a right-hand lay as with a left-hand lay.

According to a preferred embodiment of the invention the A&R system comprises further traction regulating means for adjusting the traction in each of the cables such that the rotation of the multi-cable assembly, especially at the end that is held together by the connecting means, is controllable. The traction regulating means can for example consist of at least one traction winch for each cable.

The A&R systems of the prior art had only one cable and did not allow the rotation of the connecting means to be controlled in such a simple yet very effective manner.

This rotation control can be further improved by providing a rotation-measuring device for measuring the rotation of the connecting means. This measurement can be fed back to a control device for controlling the traction regulating means. In that way a very precise control of the rotation is possible.

Another aspect of the invention relates to the winch system. The winch system preferably comprises at least a storage winch and a traction winch for each cable.

According to a preferred embodiment the winch system comprises:

at least a storage winch and a traction winch for each cable, placed at one end of the vessel;

at least a return sheave for each cable placed at the other end of the vessel; and a number of sheaves for guiding the cables from the storage winches via the traction winches to the return sheaves.

Such a system leads to longer cable lengths and has the advantage that a more structural damping is obtained and that the system is dynamically improved.

According to the preferred embodiment of the invention the connecting means comprise a cable connector which is provided with at least one hook, in which cable connector the second ends of the at least two cables are grouped.

According to a further aspect of the invention there is provided an abandonment and recovery cable connector. The cable connector comprises an elongate body with a first end and a second end. At said first end at least one hook is provided, which hook can be coupled to the load to be recovered or abandoned. The connector further comprises connection members for the at least two cables, and optionally also a rotation measuring device for measuring the rotation of said body.

According to a preferred embodiment the A&R cable connector comprises one central hook capable of recovering a load and two side release hooks capable of abandoning a load via an intermediate sling. A first end of this intermediate sling is coupled to a first side hook, while the sling passes through a lifting eye connected with the load, and is coupled at its second end to the second side hook. Such a construction has the advantage that abandonment can take place very rapidly. Also by providing two side hooks, a certain redundancy is introduced, whereby even in the event that one side hook is not working properly the A&R system can still be used. Immediately after placement of the load on the seabed, the release of one of the side release hooks is opened. The cables are pulled in whereby the sling being still connected to the other side release hook is pulled out of the shackle of the opened release hook. Further pulling the cables in by means of the winches on the vessel will lift the cable connector from the sea bed.

According to yet another aspect of the invention there is provided a method for abandoning or recovering a load, typically a pipeline or sub-sea structure, at sea. The method uses a multi-cable assembly with at least two cables for lowering, respectively raising a load during abandonment, respectively recovery of a load. Preferably the traction in each of said at least two cables is adjusted in function of the desired rotation of the load end of the multi-cable assembly. The rotation control has the advantage that the rotation of the multi-cable assembly can be kept small, and hence that the tension and torsion in the cables can be kept limited. Also the rotation control improves the positioning accuracy of the connecting means, especially during recovery of the load, so that the recovery time can be reduced.

According to a further improvement of the method of the invention the rotation at the load end of the multi-cable assembly is measured and the traction in each of said at least two cables is adjusted on the basis of the measured rotation. In that way a certain feed-back is introduced, further increasing the accuracy of the rotation adjustment.

BRIEF DESCRIPTION OF THE DRAWINGS

FIGS. 5A and 5B illustrate the abandonment procedure, and in particular the removal of the cable connector after placement of a pipeline on the seabed;

DETAILED DESCRIPTION

Figure 1:
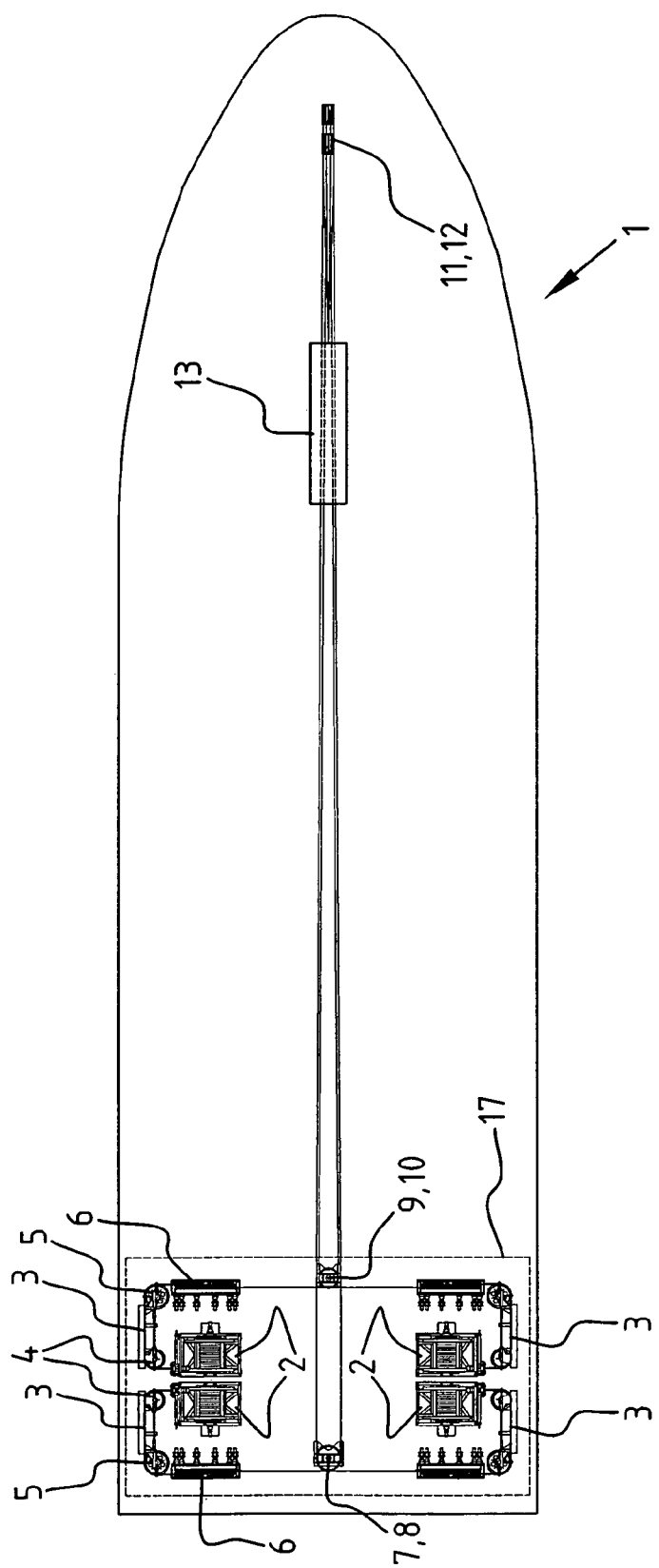
FIG. 1 is a top view illustrating schematically a part of a vessel provided with a A&R system according to a preferred embodiment of the invention.
Figure 2:
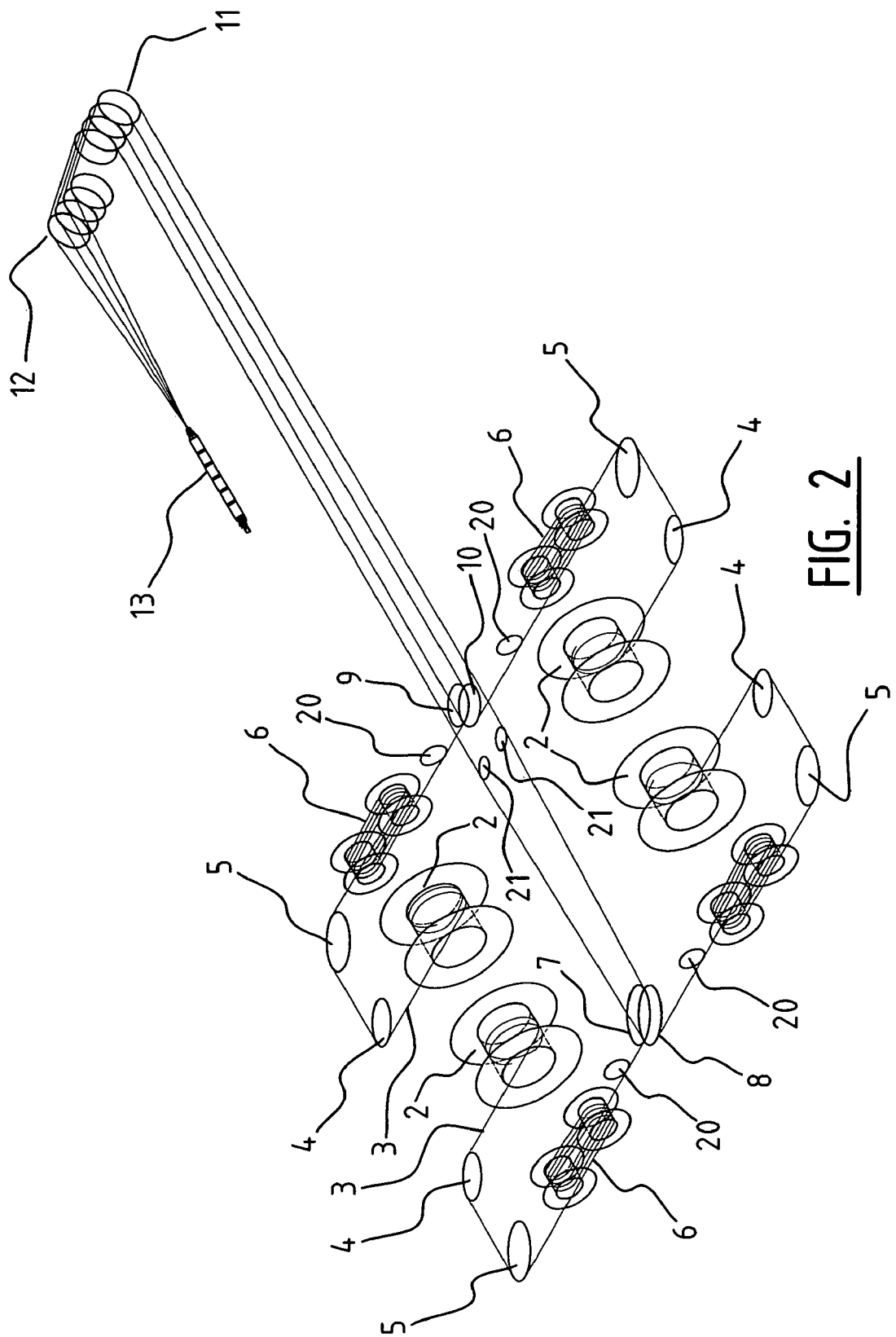
FIG. 2 is a perspective view of the wiring system with cable connector according to the preferred embodiment of the invention.

FIG. 1 shows schematically a top view of a vessel which is provided with an A&R system according to a preferred embodiment of the invention. The winch room 17 is situated at one end of the vessel 1. In the winch room 17 four storage winches 2 and four traction winches 6 are provided. From each storage winch 2 a cable 3 is guided via travelling sheaves 4, 5 to traction winch 6. Each cable 3 is brought in the axial direction of the vessel via sheaves 7, 8, 9, 10, respectively. The four cables 3 leave the winch room in the longitudinal direction of the vessel, from where they are guided to the other end of the vessel. At this other end return sheaves 11, 12 direct the cables back into the opposite direction. Each cable 3 is connected with its first end to a storage winch 2, and with its second end to a cable connector 13. The cable connector will be discussed in more detail when referring to FIGS. 3 and 4. A perspective view of this winch system with four cables and cable connector is shown in FIG. 2. As can be seen in FIG. 2 a number of additional guide rolls 20, 21 may be provided.

Figure 3:
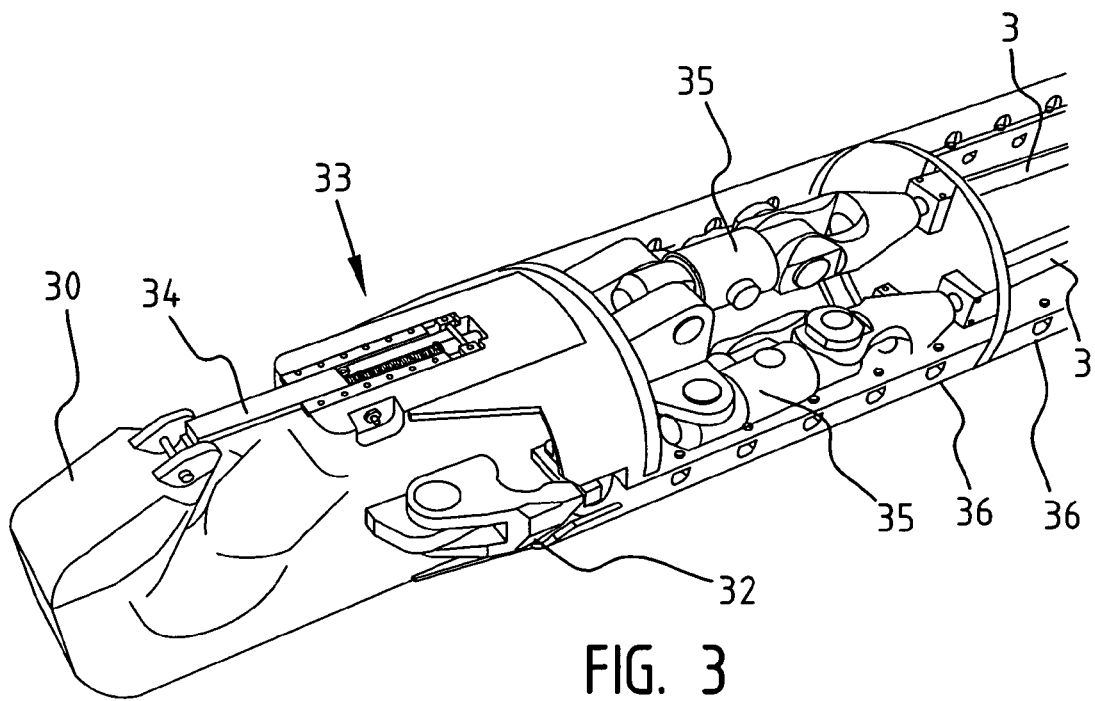
FIG. 3 is a detailed perspective view of the hook end of the cable connector according to the preferred embodiment of the invention.

FIG. 3 shows a detailed perspective view of one end part of the cable connector 13. This end part is provided with one central hook 30 with safety latch 34. Said hook 30 is used for recovery of a load. During a recovery operation the safety latch is opened and the so-called "fishing" operation takes place, wherein the operator has to place a sling coupled to the A&R head in the hook, as will described in detail when referring to FIGS. 6A-C.

The end part of the A&R cable connector is further provided with two release side hooks 32. These release side hooks are provided with opening means which are operated when a sling has to be removed from a side hook during abandonment. This will be further elucidated with respect to FIG. 5. The operation of the opening means of the release side hooks can for example be controlled with acoustics signals, or mechanically, using a robot. The cable connector further comprises four connection members 35 which are provided with load and torsion sensors.

Figure 4A:
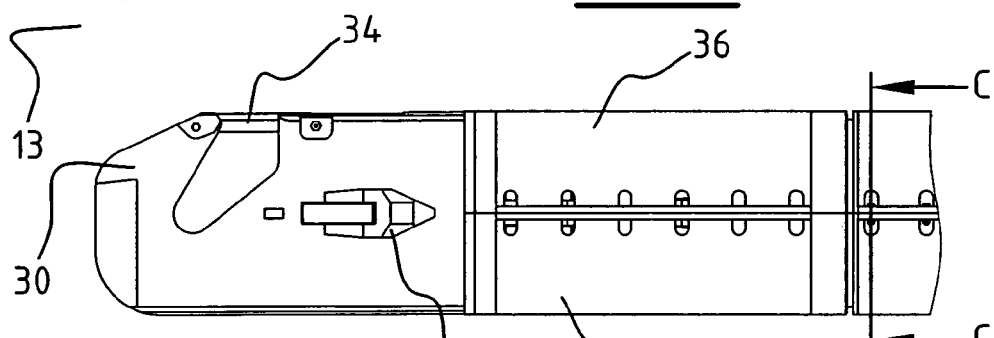
FIG. 4A is a side view of the cable connector according to the preferred embodiment of the invention.
Figure 4B:
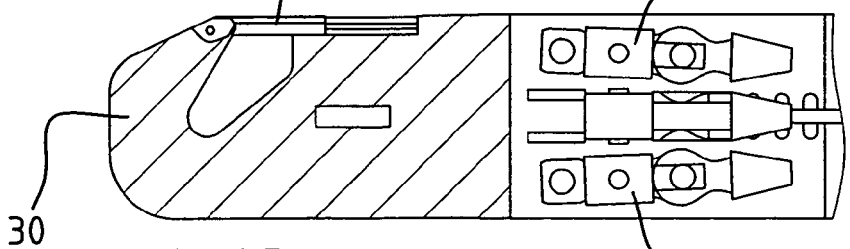
FIG. 4B is an axial section of the cable connector according to the preferred embodiment of the invention.
Figure 4C:
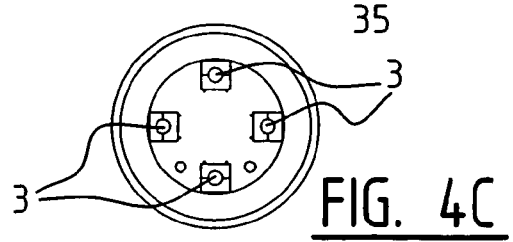
FIG. 4C is a cross section along line C-C of FIG. 4A.

FIGS. 4A and B show a side view and an axial section of the cable connector, respectively. The main body of the cable connector consists of a number of half shells 36 which are bolted together. By using this modular structure for the cable connector, it can be given a suitable length and weight by adding a sufficient number of shells 36. The minimum length of the cable connector will typically be a function of the construction of the ship and stinger. The weight of the cable connector will typically be chosen in function of the cable geometry. FIG. 4C shows a cross section of the cable connector in which the arrangement of the four cables 3 is visible.

The A&R cable connector may comprise other electronic means e.g. for controlling the operation of the central and side release hooks. According to the preferred embodiment the A&R cable connector is further provided with means for measuring the rotation of the cable connector. The means for measuring the rotation can for example be a number of gyroscopes. A signal based on the measured rotation is transferred to a control system that is coupled with traction regulating means for regulating the traction in the cables. The transfer of measurement data can for example take place by means of an acoustic modem. In the embodiment of the figures the traction regulating means comprise the traction winches 6. By providing one pair of traction winches 6 for each cable the traction in each cable can be adjusted accurately. Hence the rotation of the cable connector 13 can be controlled in an improved manner using the rotation feedback signal that is sent to the control system of the traction regulating means.

FIGS. 5A and B illustrate the abandonment procedure after placement of a load, here a pipeline, on the seabed. In FIG. 5A the pipeline is coupled to the A&R cable connector 13 via an A&R head 52 that is welded to the pipeline. The A&R head 52 is provided with a lifting eye 54. An intermediate sling 53 passes through this lifting eye 54 and is coupled with its first and second end to a first and second side hook 32, respectively. To abandon the load on the seabed, the vessel first sails backward without paying in the cables to reduce the tension in the wires. Then one of the release side hooks 32 is opened, and the intermediate sling 53 is pulled out of the shackle by pulling in the A&R cables. Finally the cables are further pulled in to lift the cable connector from the seabed.

Figure 6A:
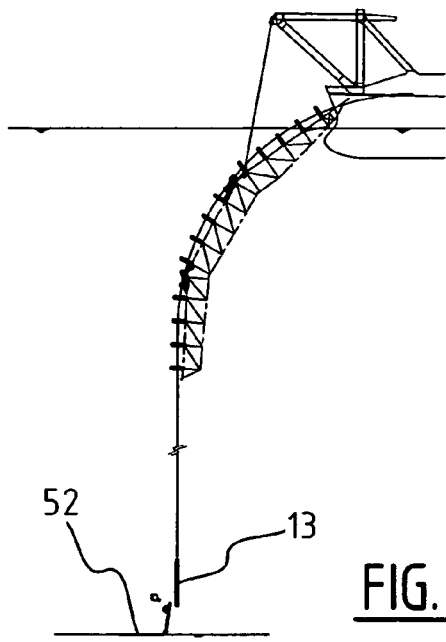
FIGS. 6A-C illustrate the recovery procedure.
Figure 6B:
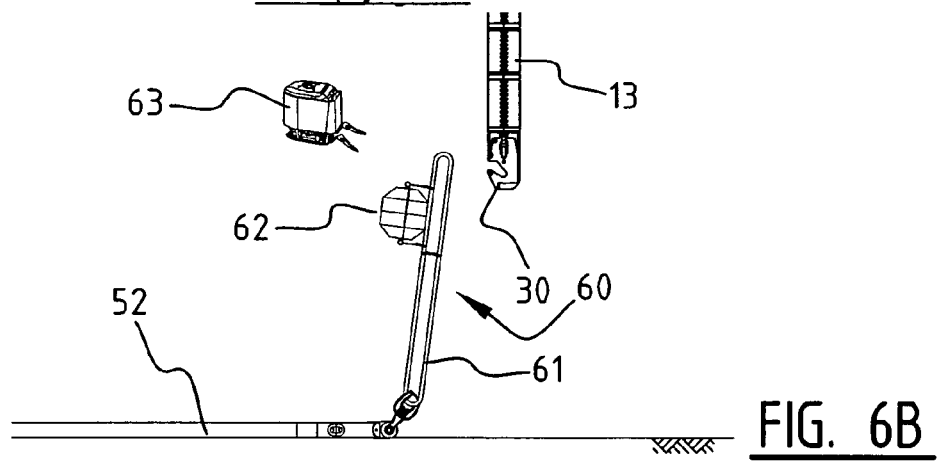
Figure 6C:
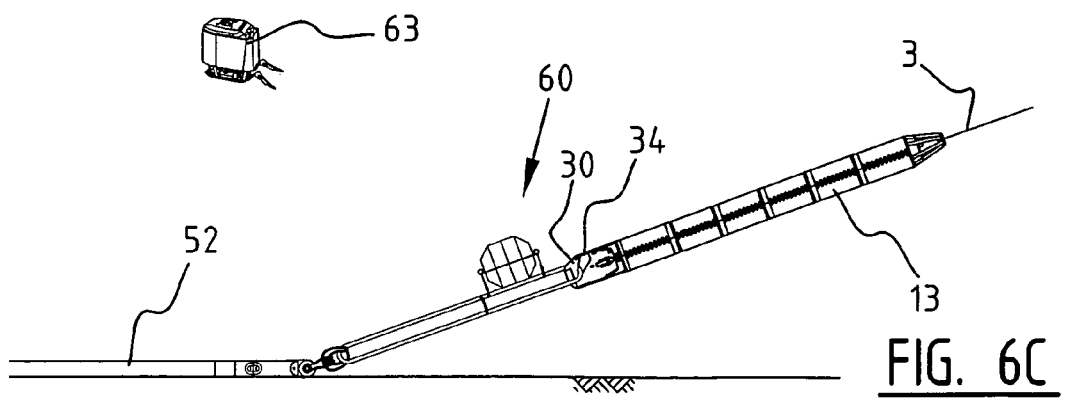

Now the recovery procedure will be described with reference to FIGS. 6A-C. The cable connector 13 is guided along the stinger in the direction of the sea bottom. During this lowering of the cable connector the rotation of the cables may be controlled by adjusting the traction in the cables as described above. When the cable connector has almost reached the bottom, the vessel is positioned such that the cable connector is in the vicinity of the recovery sling. Now the so called fishing operation can start. To increase the "fishing" chances a buoyancy assembly 60 is provided. This assembly comprises a sling 61 coupled to the A&R head 52 and a buoyancy element 62 connected to the sling 61. First the rotation of the hook 30 is checked and next the sling is guided into the hook 30, e.g. with the help of a robot 63, whereupon the safety latch 34 is closed. Next the vessel is moved over a certain distance so that the A&R cables 3 are brought in an inclined position as shown in FIG. 6C, wherein the tension in the cables is increased. The load in the cables 3 is verified and if necessary adjusted by regulating the traction in the cables and then the actual recovery the pipeline can start.

Although illustrative embodiments have been shown and described, a wide range of modification, change and substitution is contemplated in the foregoing disclosure and in some instances some features of the embodiments may be employed without a corresponding use of other features. Accordingly, it is appropriate that the appended claims be construed broadly and in a manner consistent with the scope of the embodiments disclosed herein.

What is claimed:

1. System for abandonment or recovery of a load, typically a pipeline or sub-sea structure, comprising:
    at least two cables, each with a length adapted for a certain water depth and with a first end and a second end, for lowering or raising the load;
    a winch system for said at least two cables, said first ends of each cable being connected to the winch system;
    an elongated cable connector with a longitudinal direction for connecting said second ends of each cable to the load to be abandoned or recovered;
    wherein said winch system is arranged to guide the at least two cables into the cable connector,
    wherein the at least two cables extend in the elongated cable connector, in the longitudinal direction thereof.

2. System as claimed in claim 1 comprising an even number of cables.

3. System as claimed in claim 2, wherein a number of the cables have a right hand lay and the same number of cables have a left hand lay.

4. System as claimed in claim 1, comprising traction regulating means for adjusting the traction in each of the cables such that the rotation of the second ends of the cables is controllable.

5. System as claimed in claim 4, wherein the traction regulating means comprise at least one traction winch for each cable.

6. System as claimed in claim 4, wherein the cable connector comprises a body with a connector member for each cable.

7. System as claimed in claim 1, wherein the winch system comprises at least a storage winch and a traction winch for each cable.

8. System as claimed in claim 1, wherein the cable connector is provided with at least one hook, in which cable connector the second ends of the at least two cables are grouped.

9. System for abandonment or recovery of a load, typically a pipeline or sub-sea structure, comprising:
    at least two cables, each with a length adapted for a certain water depth and with a first end and a second end;
    a winch system for said at least two cables, said first ends of each cable being connected to the winch system;
    connecting means for connecting said second ends of each cable to the load to be abandoned or recovered; and
    traction regulating means for adjusting the traction in each of the cables such that the rotation of the second ends of the cables is controllable;
    wherein the connecting means are provided with a rotation measuring device for measuring the rotation of the connecting means.

10. System as claimed in claim 9, wherein the rotation measuring device is coupled with a control device for controlling the traction regulating means.

11. System for abandonment or recovery of a load, typically a pipeline or sub-sea structure, comprising:
    at least two cables, each with a length adapted for a certain water depth and with a first end and a second end;
    a winch system for said at least two cables, said first ends of each cable being connected to the winch system;
    connecting means for connecting said second ends of each cable to the load to be abandoned or recovered;
    wherein the winch system comprises:
    at least a storage winch and a traction winch for each cable;
    at least a storage winch and a traction winch for each cable, placed at one end of the vessel;
    at least a return sheave for each cable placed at the other end of the vessel; and
    a number of sheaves for guiding the cables from the storage winches via the traction winches to the return sheaves.

12. Abandonment and recovery cable connector for abandonment or recovery of a load, comprising:
    a body with a first end and a second end;
    at least one hook provided at said first end;
    connection members for at least two cables for lowering or raising the load;
    a rotation measuring device for measuring the rotation of said body.

13. Abandonment and recovery cable connector comprising:
    a body with a first end and a second end;
    at least one hook provided at said first end;
    connection members for at least two cables;
    wherein said at least one hook consists of:
    one central hook for recovering a load;
    two side release hooks for abandoning a load via a sling.

14. Abandonment and recovery cable connector as claimed in claim 13, comprising sensor means for measuring the load and torsion in the cables.

15. Method for abandoning or recovering a load, typically a pipeline or sub-sea structure, at sea, using a multi-cable assembly with at least two cables grouped at a load end in a cable connector;
    wherein the load is connected to the cable connector;
    wherein the load is lowered, respectively raised during abandonment, respectively recovery of the load;
    wherein said at least two cables are released, respectively pulled in during abandonment, respectively recovery of a load,
    wherein the at least two cables extend in a longitudinal direction in the cable connector, the cable connector having an axis parallel to said longitudinal direction,
    wherein the cable connector is rotated around its axis by adjusting the traction in each of said at least two cables.

16. Method as claimed in claim 15, wherein the traction in each of said at least two cables is adjusted in function of the desired rotation of the load end of the multi-cable assembly.

17. Method as claimed in claim 15, wherein the rotation at the load end of the multi-cable assembly is measured and the traction in each of said at least two cables is adjusted on the basis of the measured rotation.

* * * * *

UNITED STATES PATENT AND TRADEMARK OFFICE
CERTIFICATE OF CORRECTION

PATENT NO.       : 7,621,697 B2                                   Page 1 of 1
APPLICATION NO. : 11/407766
DATED            : November 24, 2009
INVENTOR(S)      : Steenhuis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 358 days.

Signed and Sealed this

Twenty-sixth Day of October, 2010

David J. Kappos
*Director of the United States Patent and Trademark Office*